(12) United States Patent
Plumettaz et al.

(10) Patent No.: US 8,770,550 B2
(45) Date of Patent: Jul. 8, 2014

(54) PROCESS, PIG AND PRESSURE HOUSING FOR LAYING AN ELONGATED ELEMENT

(75) Inventors: Gerard Plumettaz, Territet-Veyraux (CH); Willem Griffioen, Ter Aar (NL)

(73) Assignees: Plumettaz Holding S.A., Bex (CH); EHTP, Enterprise Hydraulique et Travaux Publics, Saint-Etienne Du Grés (FR)

( * ) Notice: Subject to any disclaimer, the term of this patent is extended or adjusted under 35 U.S.C. 154(b) by 99 days.

(21) Appl. No.: 13/505,958

(22) PCT Filed: Jul. 16, 2010

(86) PCT No.: PCT/EP2010/060371
§ 371 (c)(1),
(2), (4) Date: Jul. 10, 2012

(87) PCT Pub. No.: WO2011/054551
PCT Pub. Date: May 12, 2011

(65) Prior Publication Data
US 2012/0267590 A1    Oct. 25, 2012

(30) Foreign Application Priority Data
Nov. 5, 2009    (CH) ........................................ 1712/09

(51) Int. Cl.
*B65H 59/00*    (2006.01)
*E21C 29/16*    (2006.01)
*H02G 1/08*    (2006.01)
*B63B 35/03*    (2006.01)

(52) U.S. Cl.
CPC .................................... *H02G 1/086* (2013.01)
USPC ......... 254/134.4; 254/134.3 FT; 254/134.3 R

(58) Field of Classification Search
USPC ........................... 254/134.4, 134.3 R, 134.3 F
See application file for complete search history.

(56) References Cited

U.S. PATENT DOCUMENTS 1,851,435 A * 3/1932 Jessup ......................... 254/134.4
3,547,406 A * 12/1970 Fowler et al. .............. 254/134.4
(Continued)

FOREIGN PATENT DOCUMENTS

DE    3220286 A1    12/1983
DE    4107321 A1    9/1992
(Continued)

OTHER PUBLICATIONS

International Search Report for application PCT/EP2010/060371 dated Nov. 24, 2011.

*Primary Examiner* — Lee D Wilson
*Assistant Examiner* — Alvin Grant
(74) *Attorney, Agent, or Firm* — Honigman Miller Schwartz and Cohn LLP

(57) ABSTRACT

A method for laying an elongated element in a duct using a fluid injected under pressure through a fluid inlet in a pressure housing disposed at the elongated element inlet extremity of the duct. A mechanical drive placed before the pressure housing and the duct pushes the elongated element into the pressure housing and the duct. The method includes installing a first front end pulling pig at the front end of the elongated element and installing at least one subsequent pulling pig around the elongated element. The distance between each pulling pig is mainly constant. The method also includes applying the same maximum pressure drop to each pulling pig. The total pressure of the fluid injected being mainly equally shared by all the pulling pigs.

15 Claims, 7 Drawing Sheets

(56) References Cited

U.S. PATENT DOCUMENTS

| | | | |
|---|---|---|---|
| 3,554,493 A * | 1/1971 | Bowden et al. | 254/134.3 FT |
| 4,031,750 A * | 6/1977 | Youmans et al. | 340/856.1 |
| 4,563,032 A | 1/1986 | Knowles | |
| 4,676,310 A * | 6/1987 | Scherbatskoy et al. | 340/853.4 |
| 5,197,715 A | 3/1993 | Griffioen | |
| 5,474,277 A | 12/1995 | Griffioen | |
| 5,762,321 A | 6/1998 | Petersen et al. | |
| 5,922,995 A * | 7/1999 | Allen | 174/95 |
| 6,129,341 A * | 10/2000 | Griffioen et al. | 254/134.4 |
| 6,402,123 B1 | 6/2002 | Rivard | |
| 6,722,636 B2 * | 4/2004 | Griffioen | 254/134.4 |
| 6,824,329 B2 * | 11/2004 | Van Bijsterveld et al. | 405/184 |
| 7,322,421 B2 * | 1/2008 | Blacklaw | 166/383 |
| 7,665,902 B2 * | 2/2010 | Griffioen et al. | 385/76 |
| 8,459,611 B2 * | 6/2013 | Allen | 254/134.3 R |
| 2006/0054874 A1 * | 3/2006 | Oberli et al. | 254/134.4 |
| 2008/0203368 A1 * | 8/2008 | Hamrick | 254/134.4 |

FOREIGN PATENT DOCUMENTS

| | | |
|---|---|---|
| FR | 2661051 A1 | 10/1991 |
| FR | 2663795 A1 | 12/1991 |
| JP | 57-080210 A | 5/1982 |
| JP | 60-141613 U | 9/1985 |
| JP | 03-276104 A | 12/1991 |
| JP | 04-229006 A | 8/1992 |
| JP | 2000-509597 A | 7/2000 |
| JP | 2001-028817 A | 1/2001 |
| JP | 2001-186618 A | 7/2001 |
| JP | 2002-082268 A | 3/2002 |

* cited by examiner

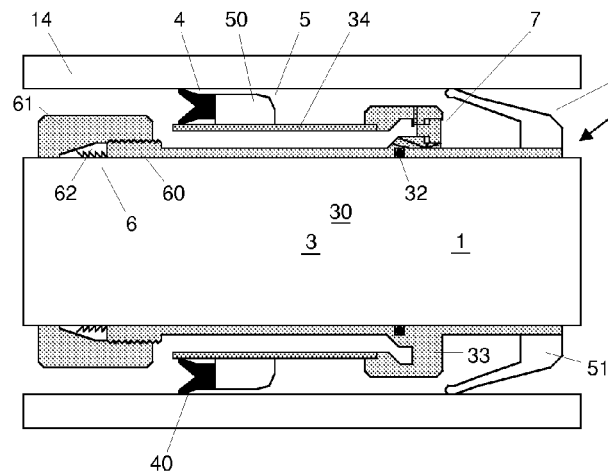
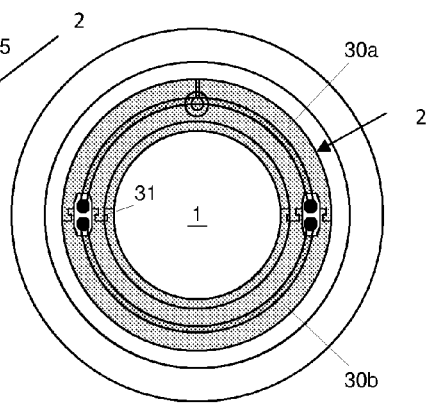
Fig 8　　　　　　　　　Fig 9
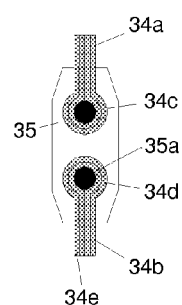
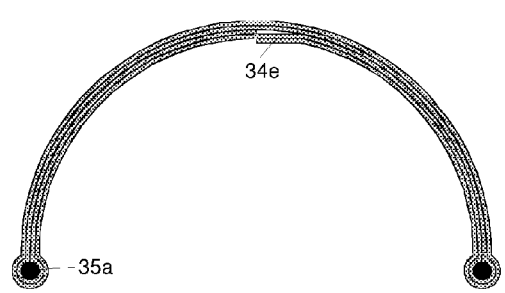
Fig10　　　　　　　　　Fig 11
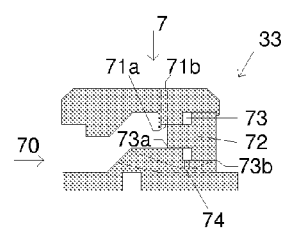
Fig 12

PROCESS, PIG AND PRESSURE HOUSING FOR LAYING AN ELONGATED ELEMENT

TECHNICAL FIELD

The disclosure concerns a process for laying an elongated element, as per example a power or telecommunication cable, in a duct just as several embodiments of a pig and of a pressure housing used with this process.

BACKGROUND

A typical method to install cables in ducts includes water is injected under pressure into the duct, exerting a pushing force at a pig attached to the front end of the cable, the pig exerting also a pulling force at the cable. At the same time the cable is pushed into the duct with water under pressure and with a mechanical drive, e.g. caterpillars or wheels, disposed at the rear end of the duct.

One system generally includes blowing a cable with the help of pistons, without sealing rings, which are released from a pressure chamber at the cable entrance point at regular intervals. The pistons are just a little smaller in diameter then the inner diameter of the duct. The force over the piston is generated by the airflow. There is no other mechanism to control the force over the pistons.

Another method generally includes using multiple pulling pigs. Here the intermediate pulling pig gets extra pulling force when the seal got stuck somewhere at the duct route (it does nothing when the duct is smooth). It is not intended here to increase cable installation length by distributing the available pushing force over more locations (and reduce the capstan effect), but to get the cable passing at positions where the cable got stuck. The front pig does not allow the passage of air, essential for functioning of the present invention.

The methods described above are often referred to as 30 push/pull method. The advantage of using water instead of air is its buoyancy, reduces the effective weight of the cable. Also it cools the frictional heat. Furthermore the safety of water under pressure is less a problem than for compressed air. This makes the technique with water under pressure suitable for use with larger cables in larger ducts, e.g. high power electric cables. However, for smaller cables in smaller ducts, e.g. telecom cables (like fiber optic cables) the same method can also be used with compressed air (still called push/pull method). Advantages in this case are that no water needs to be fed or exhausted nor remains in the duct.

SUMMARY

With push/pull methods long installation lengths can be achieved, especially in the case of water and balanced (ideally floating) cables. However, when a large pulling tension is built-up the so-called capstan effect takes over: the built-up tension pulls the cable against the duct wall in bends and undulations of the duct and causes extra friction (depending on the bends and undulations). Because this friction is proportional to the tension it causes an exponential force build-up that "explodes" soon after becoming dominant. This is especially a drawback when using water. The capstan effect dominates earlier. And then the advantage of the buoyancy of the water is completely lost.

A method for laying an elongated element in a duct using a fluid injected under pressure through a fluid inlet in a pressure housing disposed at the elongated element inlet extremity of the duct. A mechanical drive placed before the pressure housing and the duct pushes the elongated element into the pressure housing and the duct. The method includes installing a first front end pulling pig at the front end of the elongated element and installing at least one subsequent pulling pig around the elongated element. The distance between each pulling pig is mainly constant. The method also includes applying the same maximum pressure drop to each pulling pig. The total pressure of the fluid injected being mainly equally shared by all the pulling pigs.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 8 shows a longitudinal view of a first embodiment of a dividable pig according to the invention, FIG. 9 shows a sectional view of the pig of FIG. 8, FIG. 10 shows a detail of the construction of the body of the pig of FIG. 8, FIG. 11 shows another detail of the construction of the body of the pig of FIG. 8, FIG. 12 shows an enlarged view of an exemplary pressure reducing means for the pig of FIG. 8.

DETAILED DESCRIPTION

According to the process of laying an elongated element of the present disclosure more than the one pulling pig at the front end of the elongated element, e.g. a cable is used. Also intermediate pigs are placed around the cable at regular intervals. The intervals are chosen such that just when the capstan effect starts to dominate a pulling pig is placed. Note that when using multiple pigs not the full working pressure is working over each pulling pig. The pulling pigs share this working pressure. The pulling pigs are designed such that they work with a specified pressure drop (a flow of the fluid through all pulling pigs is needed to obtain this). This pressure drop is chosen such that sum of the pressure drops over the number of pulling pigs planned is the maximum working pressure monitored at the cable injection side, where also the flow is controlled.

In some implementations, the pressure at the pressure inlet at the cable insertion is increased by the pressure drop over a pig, each time when a pig is launched. Each pig can exert a pulling force on the section behind and a pushing force at the section in front of the pig. Said forces are e.g. divided 50%-50%. The front pig has no section in front, but the excess force is used to compensate extra friction that is generated at the cable head in bends and undulations of the duct trajectory due to its stiffness.

However operation is also possible with the maximum constant pressure at the pressure inlet at the cable insertion location during the complete installation provided that one pig alone and its attachment to the cable can hold such a pressure. Note that it is one of the advantages of using multiple pigs that the forces acting on a pig are smaller than when using only one pig, which improves reliability of the seals and cable attachment.

Figure 1:
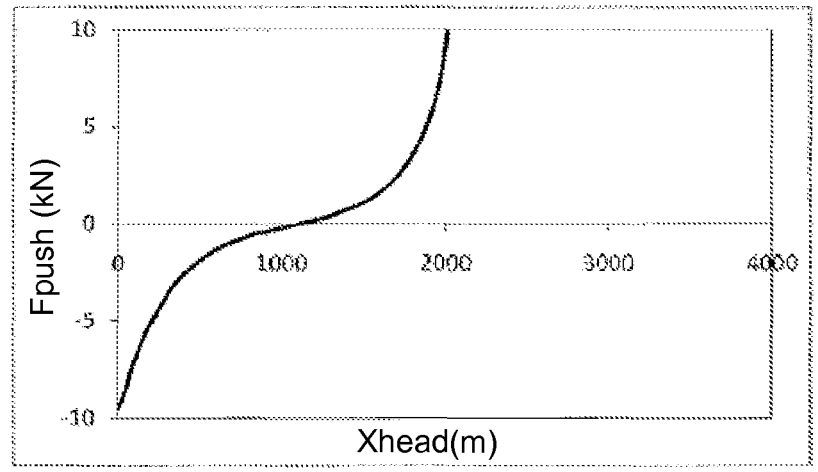
FIG. 1 is a diagram showing the pushing force (Fpush) in regard to the location of the front end of the cable (xhead) according to a process of the prior art comprising only one front end pig.
Figure 2:
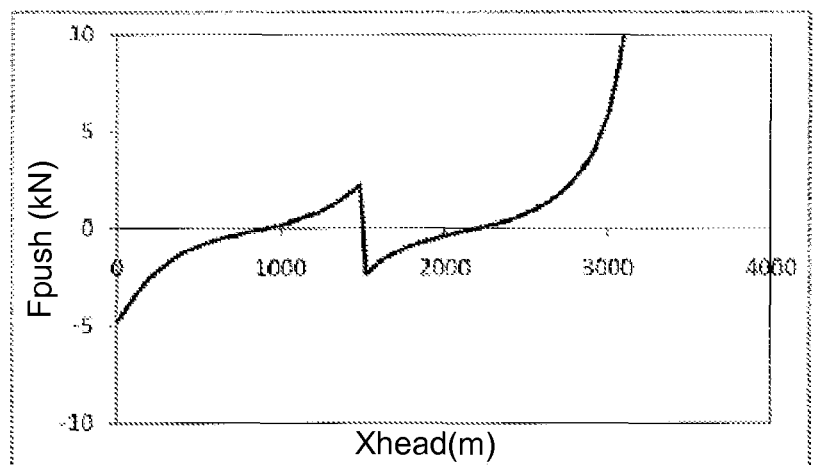
FIG. 2 is a diagram showing the same parameter of FIG. 1, according to an exemplary process including two pigs.
Figure 3:
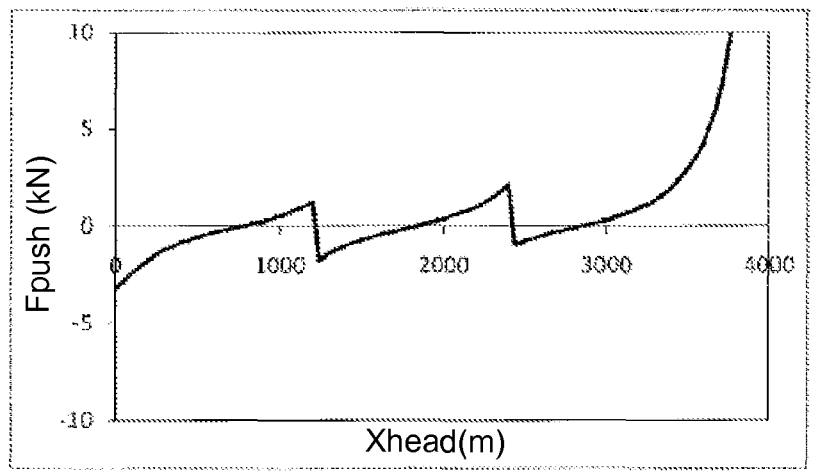
FIG. 3 is a diagram showing the same parameter of FIG. 1, according to an exemplary process including three pigs.

FIGS. 1, 2 and 3 illustrate the benefit of using multiple pulling pigs, each taking a part of the available pressure, according to the disclosure, instead of one pulling pig at the front end of the cable taking the full pressure as in the prior art. In the examples a cable with a diameter of 66 mm, weight 43 N/m and stiffness 1300 $Nm^2$ is installed in a duct with inner diameter of 102 mm that shows undulations with amplitude of 15 cm and period of 15 m (these parameters include effectively the few bends that might also be present along the trajectory). The cable is installed using water under a pressure of 12 bars that exerts a pushing force on one or multiple pulling pigs. In this water the buoyancy of the cable in the water causes the weight of the cable to drop to 9.44 N/m effectively. The coefficient of friction between the cable and the duct in this situation is taken as 0.2. At the entry side the cable is pushed into the duct with water under pressure with a force of 14000 N. Inside the duct this gross pushing force has dropped to net 9895 N, after overcoming the pressure drop over the cable inlet.

The example of FIG. 1 illustrates a laying with only one pig at the front end of the cable according to the prior art, the pushing force at the cable injection side being showed as a function of the location of the front end of the cable.

With 12 bars over the pulling pig a pulling force of 9805 N is exerted on the front end of the cable (note that this force is seen at the cable injection side when the front end of the cable is still at the cable injection side, at the start of the installation).

After a length of 2000 m the maximum net pushing force of 9895 N is reached at the cable injection side.

The example of FIG. 2 illustrates a laying with two pigs, each working with a drop of pressure of 6 bars, the pushing force at the cable injection side being showed as a function of the location of the front end of the cable.

With 6 bars over each pulling pig a force of 4903 N is exerted over each pulling pig, at the front end, and after 1500 m. After a length of 3100 m the maximum net pushing force of 9895 N is reached at the cable injection side.

The example of FIG. 3 illustrates a laying with three pigs, each working with a drop of pressure of 4 bars, the pushing force at the cable injection side may be a function of the location of the front end of the cable.

With 4 bars over each pulling pig a force of 3268 N is exerted over each pulling pig, at the front end, after 1200 m and after 2400 m. After a length of 3800 m the maximum net pushing force of 9895 N is reached at the cable injection side.

Figure 4:
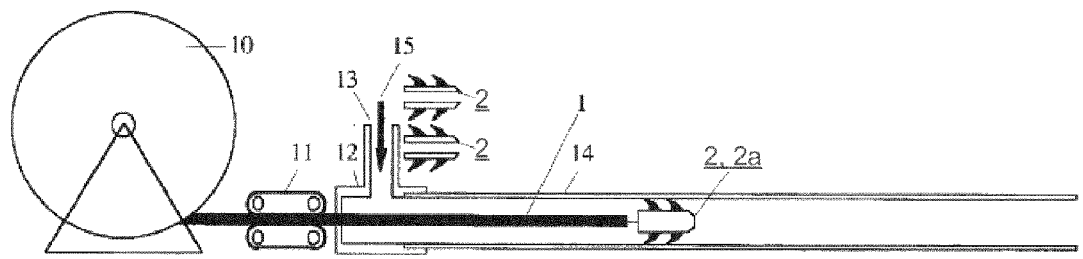
FIG. 4 shows a laying of a cable in a first step of an exemplary process, using a pressure housing.

Regarding FIG. 4, an elongated element, e.g. a cable 1 is installed from a drum 10 by pushing and fluid injection equipment, consisting of caterpillars 11 and pressure housing 12 with fluid inlet 13. The pressure housing 12 is connected fluid tight to duct 14 into which cable 1 is installed. During installation a fluid flow 15 is injected into duct 14 through pressure housing 12 and fluid inlet 13. At the front end of the cable a pulling pig 2a is connected. The pulling pig 2a is constructed such that a defined maximum pressure drop (e.g. 4 bars) is present over the pulling pig. When the pressure drop gets higher the fluid will flow through the pulling pig. It is also possible to use pulling pigs where the pressure drop over the pigs is controlled by adjusting the water flow. Several constructions, described below, are possible to obtain this functionality. During installation of the first length two dividable pulling pigs 2 are waiting. In some implementations, the pigs 2 are constructed with the same maximum pressure drop as the front pig 2a.

Figure 5:
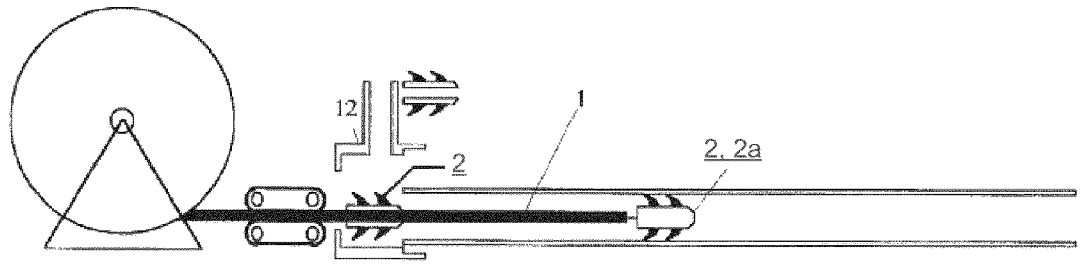
FIG. 5 shows a laying of a cable in a second step of the process.
Figure 6:
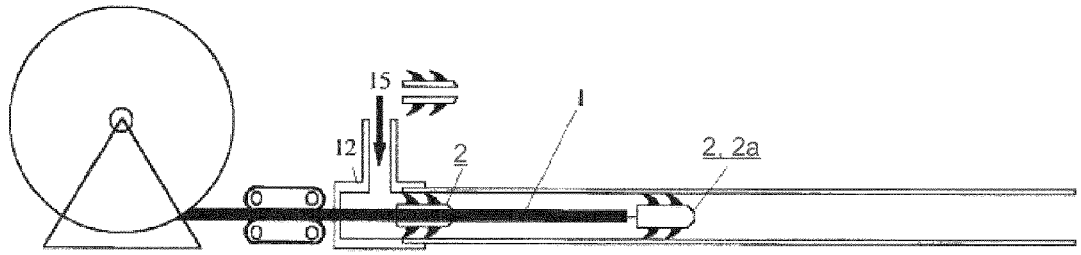
FIG. 6 shows a laying of a cable in a third step of the process.
Figure 7:
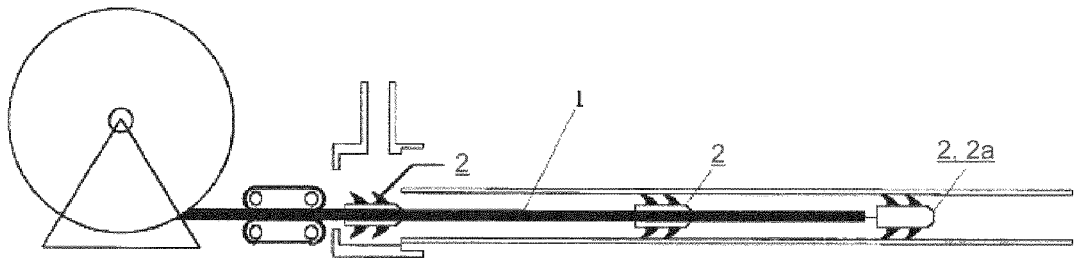
FIG. 7 shows a laying of a cable in a fourth step of the process.

In some implementations of the pressure housing 12, the fluid flow is interrupted, the pressure housing 12 is opened after installation of the first section of cable to enable placing the first dividable pulling pig 2, see FIG. 5. The dividable pulling pig 2 is than shifted forwards a little over cable 1 before final tightening. This can e.g. be done by screwing a dividable nut at the rear end or by pushing an internal piston forward. The latter can be pushed back by reversed pressure, allowing retrieval of the pig 2 (not described here). Then the pressure housing 12 is closed again and the installation started again, see FIG. 6. In FIG. 7 placement of a second dividable pulling pig 2 is shown, the same operation. This process can be continued, also with more dividable pulling pigs 2, dependent on the maximum fluid pressure that can be used. In the described example with 3 pigs 2a, 2 and 2 with maximum pressure drop of 4 bars the total maximum pressure is 12 bars.

FIGS. 8 to 12 represent an example of dividable pig 2 that can be used with the pressure housing 12 as described above. Pig 2 comprises essentially: a body 3, sealing means 4, guiding means 5, gripping means 6 and pressure reducing means 7. Pig 2 is mounted around the elongated element or the cable 1, the body 3 comprising two parts 30a and 30b which can be held together by a sliding interlock joint 31. An O-ring 32 is placed to get a fluid tight seal around the 25 cable. Said O-ring can be a length that can be glued to a ring when placed around the cable.

In some implementations, the pulling pig 2 includes a central body 30, constituted by the assembling of the two parts 30a and 30b, with a radial walled part 33 onto which a flexible cylindrical part 34 is fixed. The flexible 30 cylindrical part 34 can e.g. be made of fiber reinforced plastic foil like Kapton. After sliding the two halves 30a and 30b of the pulling pig together around the cable 1, the flexible cylindrical parts 34a and 34b—see FIGS. 10 and 11—can be connected by sliding another locking element 35 around the edges 34c and 34d of cylindrical parts 34a and 34b. Strong locking edges 34c and 34d can be made by winding layers of reinforced foil 34e around wires 35a made of hard plastic and gluing this together with e.g. epoxy.

Around the rear end of the flexible cylindrical part 34, sealing means 4, preferably a lipseal 40, can be placed. Said lipseal can be glued together in the same way as done with the O-ring 32. Said seal 40 is axially supported by support part 50. Said support part 50 also serves to centre and guide the pulling pig 2 as secondary guiding means 5.

The guiding means 5 are here completed by a main guiding element comprising several guiding fingers 51 mounted attached to the central body 30.

The gripping means 6 comprise here a part 60 disposed at the rear end of central body 30 with screw-thread. Around this a dividable nut 61, held together with the same kind of interlocking joint (not shown) as in FIG. 9, can be screwed. When screwing the nut 61a conical gripping part 62 (open aside for cable) with gripping teeth is squeezed against the cable 1, axially securing the pulling pig 2 around the cable. Screwing the nut is done after the pig is slit far enough into the duct that the seals 40 seal off.

Pressure reducing means 7 of FIG. 8 are particularly visible on FIG. 12. In the radial walled part 33 at least one pressure reducer 70 is placed having a communication between an inlet cavity left (inside) functioning as high pressure chamber 73a, and an outlet cavity 73b communicating with the cavity right (outside) of the radial wall part 33 at low pressure, in communication with the front end of the pig. Said pressure reducer 70 can be made of a piston 72 with unequal cross-sectional area at both sides (designed to the demanded pressure reduction) and at least one outlet 71a-71b communicating between the high pressure chamber 73a and the cavity 73b right of the radial walled part 33. For proper functioning a low pressure chamber 73, where the piston diameter changes, is reduced in pressure, to a pressure lower than the pressure in cavities 73a and 73b, by venturi hole 74.

Placing more than one pulling pig 2, of this kind (i.e. with only one seal) at one location of the cable allows passage of gaps in the internal duct path (e.g. at duct couplings where the duct ends not exactly abut).

Alternatively, a pig used with the pressure housing described above is represented in FIG. 13. The body 3, the sealing means 4 and the guiding means 5 are the same as described above.

Here, the gripping means 6 comprise a "socket" 63, made of wires (preferably non-metallic) that are counter-spiraled around the cable 1. The tensed wires grip the cable by friction caused by pressing the wires against the cable because of the Capstan effect.

The pressure reducing means 7 comprise an orifice 75 which regulates the pressure over the pig 2. The orifice 75 is just a short opening of a size that for a certain flow (additional to the flow to follow cable and pigs) the required pressure difference is obtained.

For a gas the dimensions of this hole can be found from sonic conditions, as described in U.S. Pat. No. 5,197,715 (1992). Note that the examples described in this invention are given with liquids (water) as a fluid, but that the invention is not limited to that, i.e. also gas (air) can be used (with the flow set e.g. by sonic conditions). For liquid the dimensions of said hole are found from the acceleration of the liquid in the hole 75 (Bernoulli law). When the speed of the liquid in the annulus between cable and duct can be neglected to the speed in orifice 75 the relation between volume flow Q, pressure difference Zip and cross-sectional area A of orifice 75 is given by:

$$Q = 0.62 \cdot A \sqrt{\frac{2\Delta p}{\rho}}$$

Here $\rho$ is the density (1 000 kg/m³ for water) and 0.62 (approximate value for fully developed flow) a factor which takes into account the narrowing of the flow after the orifice. Example: a pressure difference of 3 bars over a hole with cross-sectional area of 1.1 cm² corresponds to (additional) volume flow of 100 l/min (note that also frictional losses may not always be negligible; the right settings of the orifice(s) can be obtained by measuring). Therefore, the pressure differences over the multiple pigs can be regulated by the flow (monitored by the pressure at the inlet; the pressure difference will be equally shared by the pigs when they are equipped with the same orifices).

Figure 13:
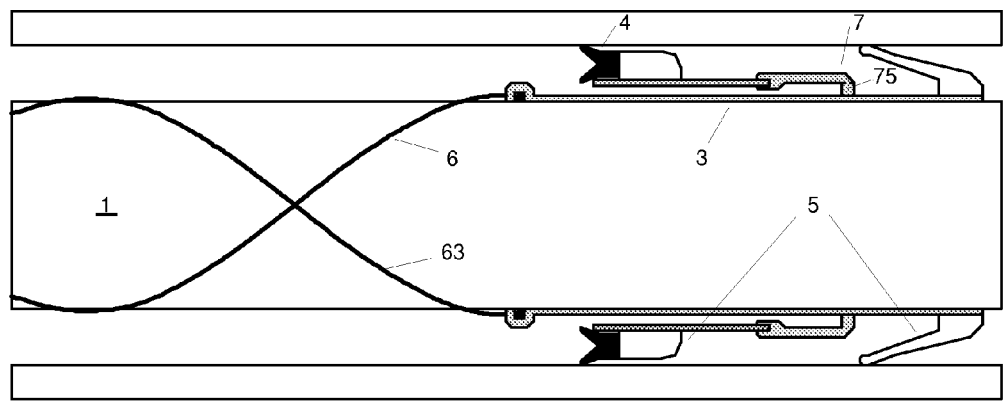
FIG. 13 shows a longitudinal view of an exemplary dividable pig.
Figure 14:
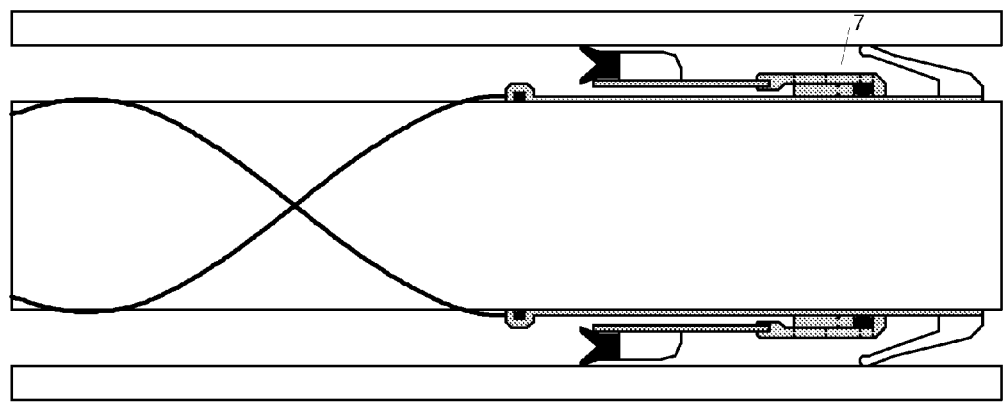
FIG. 14 shows a longitudinal view of an exemplary dividable pig.
Figure 15:
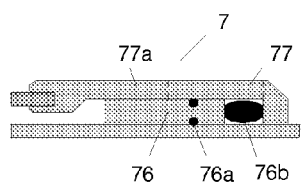
FIG. 15 shows an enlarged view of the pressure reducing means of FIG. 14.

FIG. 14 shows another example of a pig used with the pressure housing described above, the only difference with the pressure housing of FIG. 13 being on the pressure reducing means 7 which are represented at enlarged scale on FIG. 15.

The pressure reducing means 7 comprise an annular piston 76, moving under the action of the pressure difference (sealed airtight by O-rings 76a; note that for an annular piston as in FIG. 14 with diameter of around 70 mm a cross-sectional area of 1.1 cm² corresponds to an annular gap of 0.5 mm; this means that the O-rings 76a are often needed for correct functioning of the system) in radial walled part 33, and balanced by resilient ring 76b, made of natural or synthetic rubber (e.g. Nitrile, Silicone or natural rubber) or other material. Note that here an entirely non-metallic pig is chosen, to which this invention is not limited. In case that metal is allowed solutions with springs are possible. The pressure left of annular piston 76 is the pressure at the back of the piston, the pressure right of piston 76 the pressure at the front. The latter pressure is allowed through hole 77 in radial walled part 33. When there is no pressure difference between the back and the front of the pig, annular piston 76 is pressed to the left by resilient ring 76b. When the pressure at the back of the piston is higher than at the front the piston starts moving to the right. The system is developed such that when the demanded pressure difference is reached, annular piston 76 has moved to the position that hole 77a just starts opening. From that moment on air is bleeded from the back to the pig to the front, and further increase of the pressure difference is prevented. Advantage of this (and also the first) embodiment is that it can be made independent of the flow, avoiding overpressure by wrong operation. In fact also the combined advantage of maximum overpressure and some regulation of the pressure difference by the flow is possible, depending on the size of the holes 77a and also by selecting a proper annular gap for piston 76 (and not using O-rings 76a).

Example: An annular piston 76 with inner diameter of 70 mm and a wall thickness of 4 mm has a working cross-sectional area of 9.3 cm². A pressure difference of 3 bars will result in a force on this piston of 279 N. The rubber ring 76b is a little smaller (space is required for Poisson expansion), in this example 72 mm ID and 76 mm OD resulting in a working cross-sectional area of 4.65 cm². A soft rubber with a Young's modulus E of 1 MPa is selected (these values can be obtained with silicone or natural rubber). According to Hooke's law the force for a 3 bars pressure difference will result in 60% compression of the rubber. For a 6 mm thick rubber ring this will be 3.6 mm (optionally this 3.6 mm can be partly pre-compressed). In the 3 bars position the holes 77a just start to open (for a pig designed for 3 bars pressure difference). At 4 bars the holes are opened 1.2 mm. For an almost continuous slit (instead of holes) this is amply more than the 0.5 mm needed for flowing through of 100 l/min (this is an example flow; pumps can often supply more and lower settings are also possible). It is also possible to drill holes, e.g. holes with a diameter of 10 mm. In the latter case 1.2 mm opening results in 0.054 cm², so 19 holes will just do the job (and there is just place for 19 holes). Larger (and less) holes will result in more throughputs.

The examples of FIGS. 16 and 19 make use again of an orifice for pressure regulating, like the pig of FIG. 13. The design is made simple, with all parts dividable except the seal (this seal can easily be preinstalled over the cable, even when a large head is pre-mounted at the cable front end; optionally, in cases that an unplanned pulling pig needs to be placed gluing a split ring is still an option).

Figure 16:
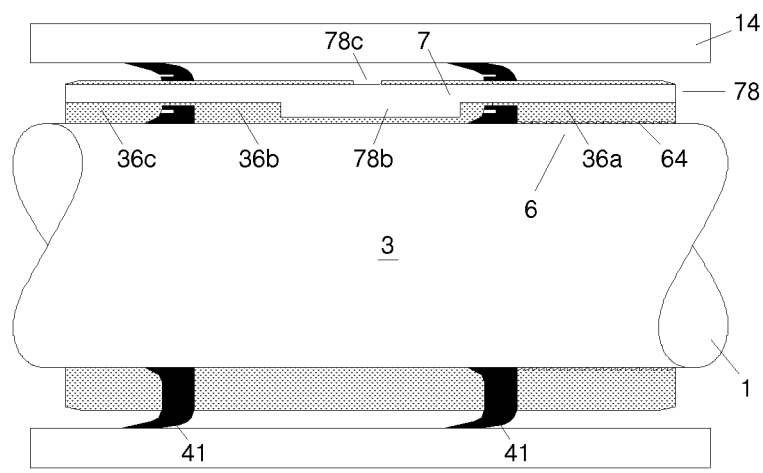
FIG. 16 shows a longitudinal view of an exemplary dividable pig.
Figure 17:
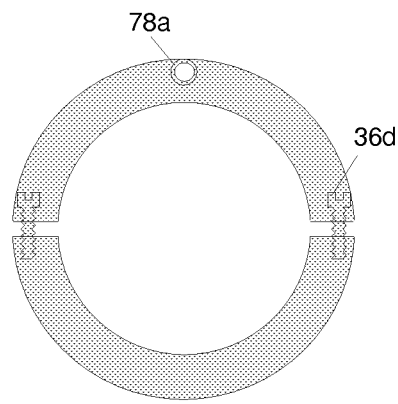
FIG. 17 shows a sectional view of a part of the pig of FIG. 16.
Figure 18:
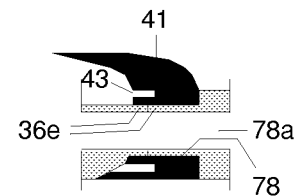
FIG. 18 shows an enlarged view of a portion of the sealing means of the pig of FIG. 16.

The dividable body 3 of the pulling pig 2 represented at FIG. 16 consists of 3 dividable sections 36a, 36b and 36c. The front section 36a comprises the gripping means 6 having a firm grip on the cable 1 by means of teeth 64. All dividable sections 36a, 36b and 36c are clamped together by bolts 36d, the front section 36a tightly bolted. Between the sections 36a, 36b and 36c the sealing means 41 are placed (now 2 seals are present, i.e. one pulling pig is able to pass gaps in the internal duct path). They are preferably made of rubber-like material that makes a suction seal with both duct and cable. The seals are made of one piece, or can be cut at one place and glued around the cable when placed. The pressure reducing means 7 comprise at least one hole 78, present in the seals—see FIG. 18—(one hole is shown in the drawings for clear presentation, preferably at least 2 holes are present, allowing less costly design of the other parts because of symmetry). This hole 78 is again suction sealing to body sections 36a, 36b and 36c, enhanced by the annular groove 43 in seal 41, where the "lips" seal around pieces of pipe 36e extending from the sections 36a, 36b and 36c. The holes 78 in the seal and cylindrical hollow portions 36e in the body sections 36a, 36b and 36c, also provide correct aligning of all parts. The pieces of pipe 36e have a hole 78a inside them that extends through the hole body 3. Halfway this hole 78a, in body section 36b, a cavity 78b is made to allow deceleration of the flowing medium. This, together with hole 78c that vents to the space in the duct, makes it possible to have three different pressure zones for the three body sections.

Figure 19:
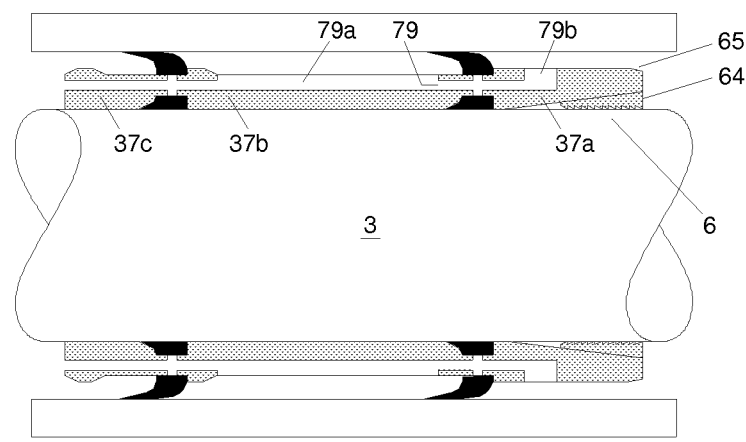
FIG. 19 shows a longitudinal view of an exemplary dividable pig.

In FIG. 19 a similar design as in FIG. 16 is shown. Only now the parts 37a, 37b and 37c of the body 3 are not bolted together, but are held together by a sliding interlock joint as on the embodiment shown on FIG. 9. The gripping means of front section 37a comprise two concentric tapered elements 37a and 64. 37a houses the female taper. The clip 64 with internal gripping teeth forms the male taper. The clip 64 can be sufficiently open to engage radially on and embrace the cable 1. The axial force caused by the pressure drop acts on the female taper of 37a, creating thus a sufficient inward radial force on the teeth of the clip 64 to grip and push cable 1.

Part 37a again consists of 2 halves held by a sliding interlock joint. Also now two holes have been designed. And, contrary as the example of FIG. 16, there is no annular groove 43 now in seal 41. For this it is required that the material of the seal is hard enough that the hole 78 is not "blown up" (there is then still suction sealing because the seals are pressed forward against body section 36a and 36b). Furthermore cavity 78b is not present anymore, but material is completely machined away such that the hole 79 immediately exhausts in the duct space sections 79a and 79b. Finally the body is made a little smaller in diameter at the places where the seals will be pushed when the duct gets smaller, so 92 mm remains the smallest total diameter.

A first or front end pulling pig 2a, as illustrated in FIGS. 4 to 7, is constructed of the same manner as described above, the only differences being that the body 3 is not tubular but preferably of the form of a solid piston with a hemispherical or truncated head. The gripping means 6 are also designed to grip the front end of the elongated element or the cable.

Several other implementations of a pressure housing are described below, these implementations not necessitating a dismantling of the laying device for the insertion of a new pig and also not necessitating to use dividable pigs.

Figure 20:
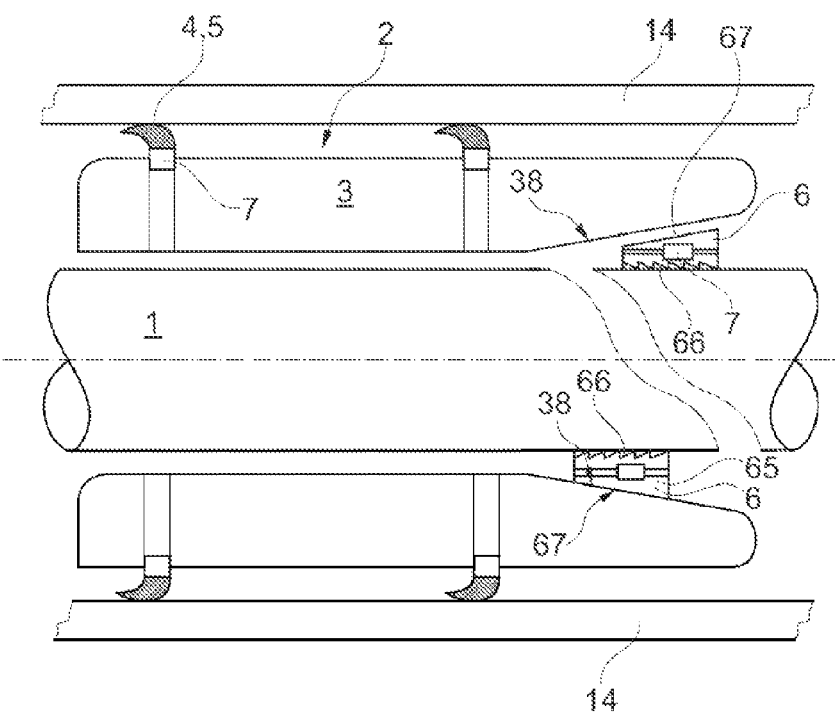
FIG. 20 shows another exemplary pig.

These pressure housings use a different pigs 2, as shown in FIG. 20, than the pigs previously described. As the previous pig 2 comprises a tubular body 3. Here the body 3 is constituted from only one tubular element, his inner diameter being a little greater than the external diameter of the cable 1. The sealing means 4 are from one of the embodiments previously described. In this execution, the guiding means 5 are constituted by the sealing means 4. The gripping means 6 are here constituted by a separate element, a gripping ring 65, comprising on its inner surface facing the cable 1, grips or teeth 66. The gripping ring 65 comprises a tapered external surface 67 able to cooperate with a corresponding tapered front inner surface 38 of the tubular body 3. On the upper part of FIG. 20, we can see the gripping ring 65 just lay down on the cable 1. On the under part of the FIG. 20, the pig 2, under action of a pressure exerting a force from the left to the right of the Fig rejoins the gripping ring 65, the tapered front inner surface 38 of the tubular body 3 pressing against the tapered external surface 67 of ring 65, the grips 66 hemming the cable 1. According to this manner, pig 2 is firmly fixed on cable 1. Pressure reducing means, schematically represented at 7, are of one of the types described above. Alternatively, the pressure reducing mean 7 can be installed in the gripping ring 65 instead in the body 3.

Figure 21:
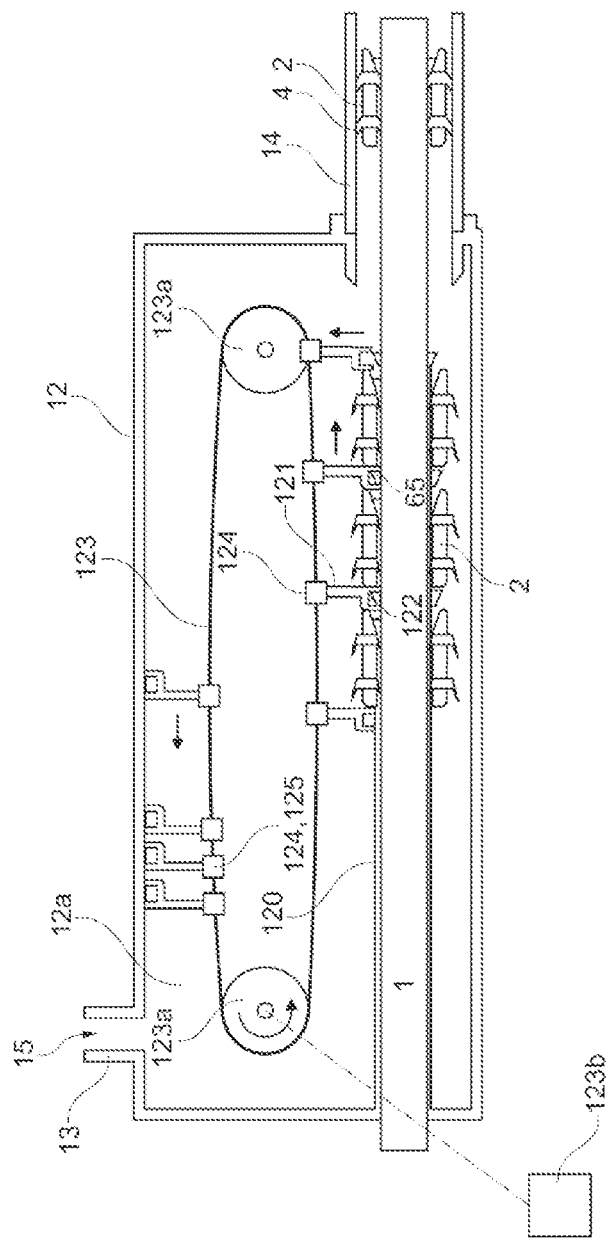
FIG. 21 shows an exemplary pressure housing.

Another example of a pressure housing 12 is represented on FIG. 21. Cable 1 is introduced in duct 14, pressure housing 12 is connected to the duct 14 and pressure flow of water 15 is introduced in pressure housing 12 of the same manner as previously described.

The pressure chamber 12 comprises a sleeve 120 surrounding the cable 1, the diameter of the sleeve 120 being chosen as narrow as possible, but leaving enough margin to pass cable diameter fluctuations (usually specified). Pigs 2 are parked on sleeve 120, each being held by a fork 121. Inside the fork 121 there is a separate parking position 122 for the gripping ring 65. This is needed for sliding the pig 2 over sleeve 120, without the griping ring 65 being pressed to sleeve 120 by forward pressing of the pig 2 via the tapered conical surface 38 to the corresponding surface 67 of the griping ring 65. Furthermore, sleeve 120 is made of hard material (e.g. steel) onto which the grips or teeth 66 of the griping ring 65 have no grip.

Each fork 121 is connected to a rotating belt 123 pivoting around two wheels 123a, at least one of these wheels being driven by driving means 123b, motorized or manual. To release a pig 2, the driving means 123b are activate, the forks 121 being moved in direction of the duct 14. When the front fork 121, the fork being closest of duct 14, reaches the end of sleeve 120 it is lifted up by lifting means 124 or caused by the curvature of the belt 123 around front wheel 123a, first to release the griping ring 65, and looses it from the sleeve 120. The gripping ring 65 snaps the cable 1 with its smaller diameter by resilient working of the hard-plastic material. A slit being provided inside griping ring 65 to allow this. After this, the fork 121 closest of duct 14 is lifted further to also release pig 2. The resilient sealing means 4 of the pig 2 will make a suction seal to the cable 1 and, when inside, also to duct 14. The water flow will move pig 2 forward until it meets up its griping ring 65. Now the water pressure will result in the grips or teeth 66 pressing on cable 1. Simultaneously the lifted fork 121 will be taken out of the way and the other forks 121 are moving forward by activating the driving means 123b, until the pig 2 leaves sleeve 120 and surrounds the cable 1. Optionally the lifting means 124 can comprise clutch means 125 to clutch the fork from the belt 123 permitting the parking of the used forks 121 in a parking portion 12a of the pressure chamber 12.

Figure 22:
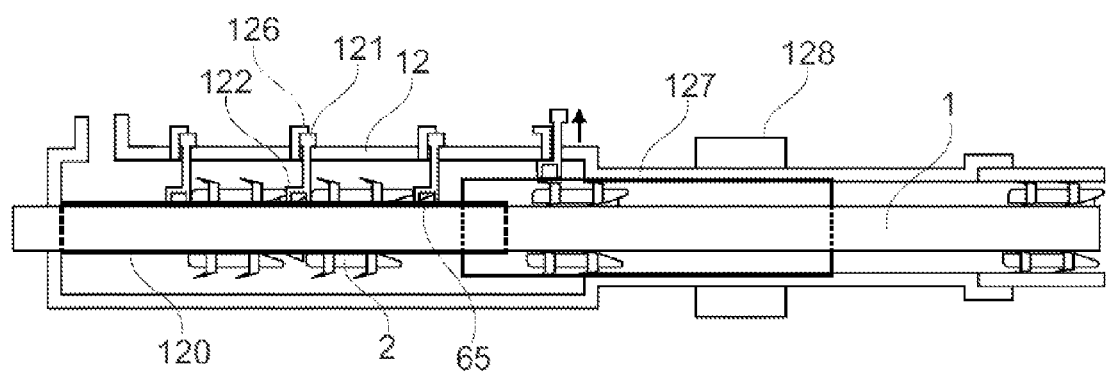
FIG. 22 shows another an exemplary pressure housing according to the disclosure.

Another exemplary pressure housing 12 is shown on FIG. 22. As previously described, the pigs 2 are stocked on a sleeve 120, each pig 2 being held by a fork 121, a gripping ring 65 being held in the separate parking position 122. In this example, the forks 121 are lifted, manually or by motorized means not represented on the figure, from outside the pressure housing 12. Sealing fork means, e.g. an O-ring, (not represented) assume the sealing of each fork 121 through the pressure housing 12. A rotating clamp 126 permits to hold the fork 121 on low position. When released, the pressure inside pressure housing 12 will cause the fork to move to high position and to park them in the parking portion 12a of the pressure housing 12. When the fork 121 has been entirely lifted up, a mobile sleeve 127 is pushed backwards by motorized or magnetic means 128 disposed outside the pressure housing 12, such that at least the first seal of the released pig 2 is enclosed by the mobile sleeve 127. As the water flow can only go through mobile sleeve 127, it will cause a pressure difference over the released pig 2, moving it forward. As the pig 2 and the gripping ring 65 will slide over sleeve 120, it is needed that sleeve 120 is made of hard material onto which gripping ring 65 has no grip. The mobile sleeve 127 has to be thin-walled permitting the easily pass of pig 2 by suction sealing, through the portion 129 of the pressure housing 12 with slightly larger diameter in the section immediately after the rear part of the mobile sleeve 127.

In case of high power electric cables, and when the pig 2 cannot be retrieved, the pig shall be made entirely out of non-metallic parts. In some examples, the pig 2 is radial symmetric. In order to reduce friction of the pulling pig also an asymmetric design is possible, allowing the cable to follow the bottom of the duct. For a symmetric design the friction can also be reduced by means of wheels facing against the duct wall. For retrieval of symmetrical pigs also wheel facing against the cable wall can be used.

Many implementations of a pulling pig have been described above; it is to understand that a body 3 of one or other of the forms as described can be combined with a sealing means 4 of one or other of the forms as described, and with a guiding means 5 of one or other of the forms as described, and with a gripping means 6 of one or other of the forms as described, and with a pressure reducing means 7 of one or other of the forms as described.

As described above the process according to the disclosure used with the pulling pigs and the pressure housing according to one or other of the described implementations are particularly designed for the laying of very long cables or longitudinal elements.

The invention claimed is:
1. A method for laying an elongated element in a duct using a fluid injected under pressure through a fluid inlet in a pressure housing disposed at the elongated element inlet extremity of the duct, a mechanical drive placed before the pressure housing and the duct pushing the elongated element into the pressure housing and the duct, the method comprising:
  installing a first front end pulling pig at the front end of the elongated element;
  installing at least one subsequent pulling pig around the elongated element; and
  applying the same maximum pressure drop to each pulling pig, the total pressure of the fluid injected being mainly equally shared by all the pulling pigs.
2. The method of claim 1, wherein the distance between each pulling pig is determined to be inferior to the distance on which a capstan effect, respectively a pulling of the elongated element against the duct wall in bends and undulations of the duct, dominates the method.
3. The method of claim 1, wherein applying the same pressure drop to each pulling pig comprises supplying to each pulling pig:
  a body;
  a seal sealing between the front end and the rear end of the pulling pig;
  a guide guiding the pulling pig into the duct;
  a gripper for gripping the elongated element; and
  a pressure reducer assuring a determined drop of pressure between the rear end and the front end of the pulling pig.
4. The method of claim 3, wherein the pressure reducer comprises:
  a plurality of holes defined by a radial wall part protuberant from the body of the pig, each hole comprising a first high pressure chamber with a first diameter communicating with the rear end of the pig, and a second low pressure chamber with a second diameter communicating with the front end of the pig, the first diameter being smaller than the second diameter; and
  a piston being able to move in the hole having a first portion with the first diameter and a second portion with the second diameter, the first and second diameter being chosen accordingly to the determined drop of pressure, a second hole communicating from the first high pressure chamber and a cavity at low pressure communicating with the front end of the pig, the radial wall part defining a venturi hole whose central portion communicates by a third hole with a portion of the hole disposed where the hole diameter changes, to reduce the pressure in the portion to a pressure lower than the pressure in the high pressure chamber and in the low pressure chamber, the piston being able to open or close the second and third holes accordingly to the drop of pressure encountered.
5. The method of claim 3, wherein the pressure reducer comprises a plurality of holes defined by a radial wall part protuberant from the body of the pig, each hole establishing a communication between the rear end of the pig at high pressure and the front end of the pig at low pressure, the total size of all holes being determined by the pressure drop produced by the flow of fluid through the holes.
6. The method of claim 3, wherein the pressure reducer comprises an annular piston able to move inside an annular chamber disposed coaxially outside the body in a radial wall part, the annular piston being subjected from one side to the high pressure at the rear end of the pig and from other side to the resilient force of a resilient ring at the bottom of the chamber, a first hole establishing a communication between the front end of the pig at low pressure and the bottom of the annular chamber, a second hole establishing a communication between the rear end of the pig at high pressure and the front end of the pig at low pressure, both holes being alternatively opened or closed by the piston the difference of pressure between the rear end and the front end of the pig.
7. The method of claim 6, wherein the annular piston is sealed airtight by an 0-ring.
8. The method of claim 3, wherein the seal comprise two lipseals disposed the one after the other around the body and determining a first cavity between the external surface of the body, the internal surface of the duct and both lipseals, at least one longitudinal hole defined by the body establishing a communication between the front end of the pig at low pressure and the rear end of the pig at high pressure, a radial hole establishing a communication between a central portion of the hole and the first cavity.

9. The method of claim 8, wherein the central portion of the hole comprises a deceleration cavity.

10. The method of claim 3, wherein one of the pulling pigs is designed to be a first front end pulling pig, wherein the body has a solid piston with a hemispherical or truncated head.

11. The method of claim 3, wherein one of the pulling pigs is designed to be one of the subsequent pulling pigs, wherein the body is essentially tubular, comprising at least two semi tubular portions assembled together around the longitudinal element.

12. The method of claim 11, wherein the semi tubular portions of the body are assembled by a sliding interlock joint.

13. The method of claim 11, wherein the semi tubular portions of the body are assembled by bolts.

14. The method of claim 3, wherein the body is essentially tubular, the inner diameter of that body being larger than the external diameter of the elongated element, the gripper being a separate part, comprising a gripping ring comprising grips on its surface facing the elongated element, and a tapered surface cooperating with a corresponding tapered surface on the front part of the body, the pressure of the body against the gripping ring assuming the fixation of the pulling pig with the elongated element.

15. The method of claim 1, wherein installing at least one subsequent pulling pig around the elongated element comprises installing a plurality of subsequent pulling pigs around the elongated element, wherein the distance between each pulling pig is mainly constant.

* * * * *